Figure 1:
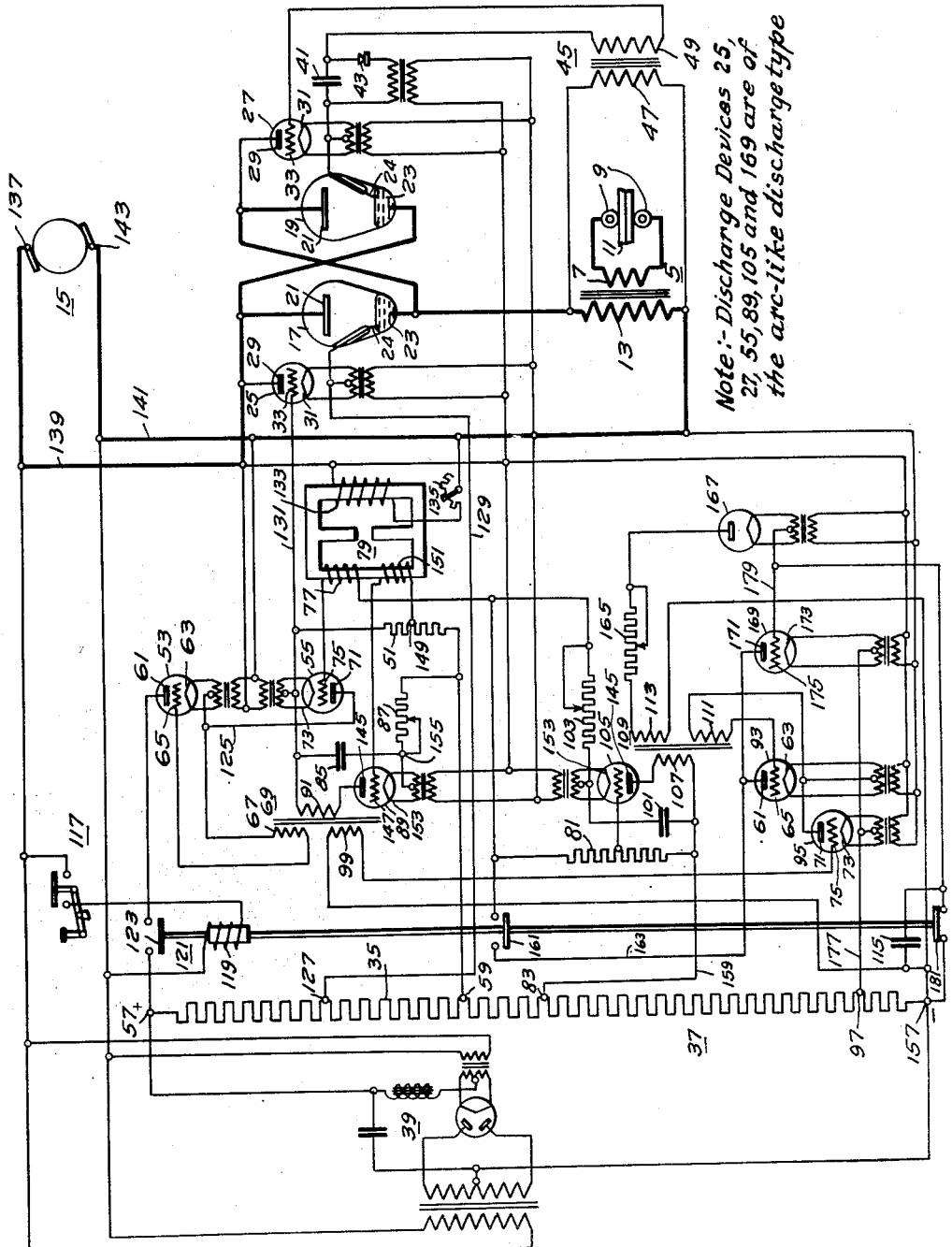

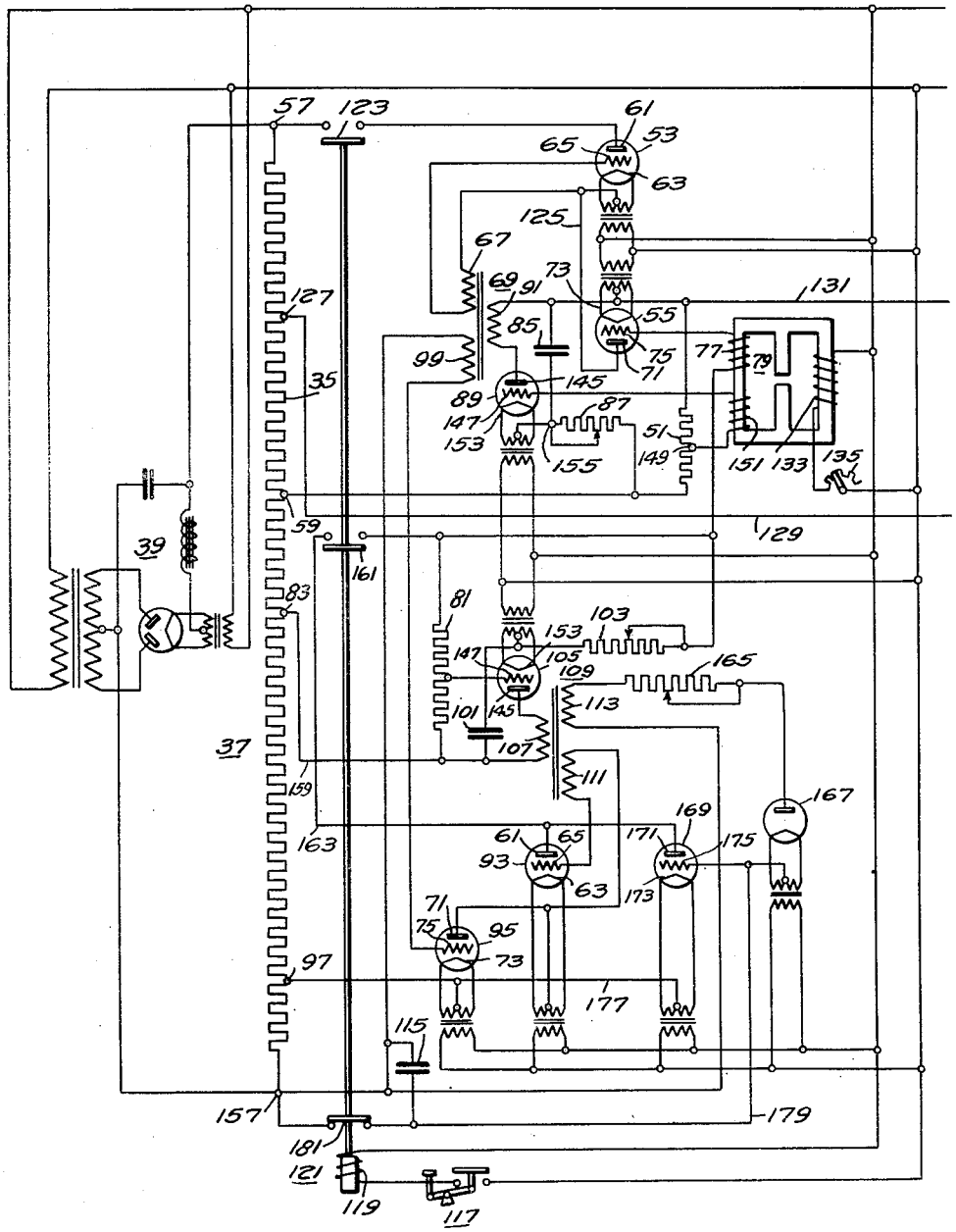

Dec. 1, 1942.   F. H. GULLIKSEN   2,303,453
WELDING TIMER
Filed May 5, 1939   4 Sheets-Sheet 3

Note:- Discharge Devices 25, 27 and 223 are of the arc-like discharge type.

WITNESSES:   INVENTOR
              Finn H. Gulliksen.
              BY
              ATTORNEY Dec. 1, 1942.  F. H. GULLIKSEN  2,303,453
WELDING TIMER
Filed May 5, 1939  4 Sheets-Sheet 4
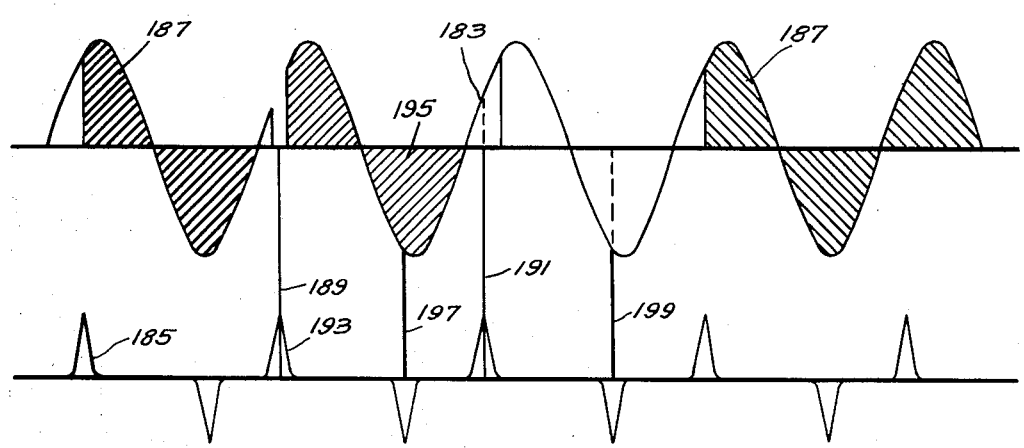
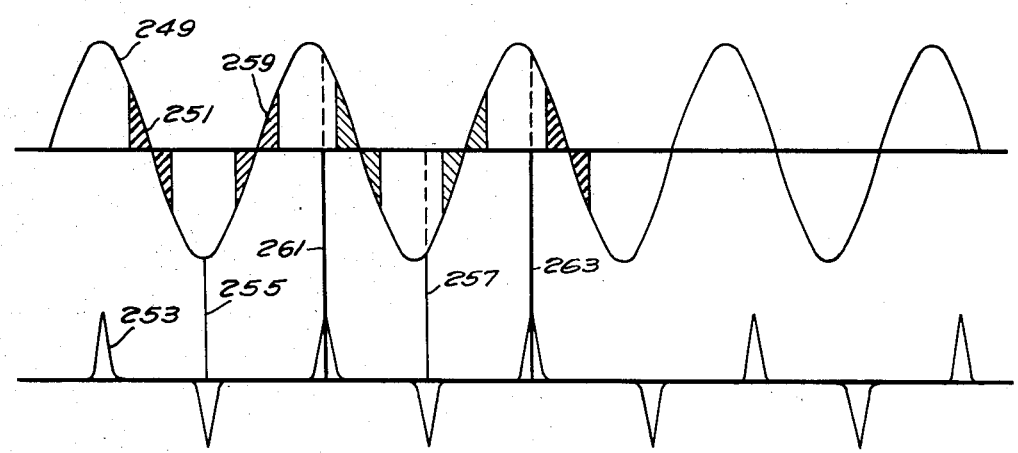
WITNESSES:  
E. A. M?Closkey.  
Hyman Diamond
INVENTOR  
Finn H. Gulliksen.  
BY  
F. W. Legle.  
ATTORNEY Patented Dec. 1, 1942

2,303,453

UNITED STATES PATENT OFFICE 2,303,453

WELDING TIMER

Finn H. Gulliksen, Pittsburgh, Pa., assignor to Westinghouse Electric & Manufacturing Company, East Pittsburgh, Pa., a corporation of Pennsylvania Application May 5, 1939, Serial No. 271,951

16 Claims. (Cl. 250—27)

My invention relates to electric discharge apparatus and has particular relation to welding systems incorporating electric discharge valves.

Recent developments in resistance spot and seam welding have revealed that highly uniform welds of good quality may be obtained by supplying to the material to be welded a predetermined number of discrete impulses of current to produce each weld. Each impulse is of a predetermined length and there is a predetermined time interval between impulses. This method of joining materials is known as interrupted spot welding. In the usual practice of the method, the welding current is supplied from an alternating current source and each impulse flows during a predetermined number of half periods of the source. The intervals between the impulse are also measured in half periods.

The provision of a timer for interrupted spot welding is a problem of no mean magnitude. The manufacturer of welders cannot economically provide a separate design for every material and the user of welders cannot be expected to purchase a separate welder for every material that is to be welded in his shop. There must therefore be substantially no limitation as to the materials for which an interrupted spot welder can be used. Since a large number of materials having widely varying dimensions and a vast range of diverse properties are involved, it is vital that as regards the various intervals involved in the welding operation, the timer should be adjustable over a wide range. This involves the possibility of varying the total number of impulses supplied to produce a single weld from one to a substantial number such as 20 or 30; it involves the variation of the length of each impulse from a half period of the source to 20 or 30 periods; and it involves the same variation for the pause interval between impulses. For purposes of economy, it is desirable that the arrangement should be convertible at any time into a single-impulse seam or spot welder. This imposes the condition that for a certain setting of the timer only a single welding current impulse shall flow and for another setting impulses of a predetermined length shall flow indefinitely.

It is, accordingly, an object of my invention to provide a universal welding system.

Another object of my invention is to provide a system of relatively simple structure for interrupted spot welding that shall be convertible into a single impulse spot or seam welder.

A more general object of my invention is to provide an arrangement for supplying power from a source to a load in discrete units, each unit being made up of any desired number of impulses, each impulse persisting for a predetermined interval of time and the impulses occurring at time intervals of predetermined length.

An ancillary object of my invention is to provide a novel arrangement for the control of electric discharge valves of the arc-like type.

More concisely stated, it is an object of my invention to provide a tractible universal welding system using a minimum number of electric discharge valves and control circuits.

In accordance with my invention, the length of time during which each welding current impulse flows, which shall be herein designated as the on-time interval, is measured by charging a capacitor through a pair of electric discharge valves. One of the valves is of the high vacuum type and the other is of the arc-like type. The valves are connected in series so that when either of them is non-conductive, the flow of charging current is interrupted. Initially, the high vacuum valve is capable of conducting current and the arc-like valve is rendered conductive at a predetermined instant in a half period of the supply source. Both valves now conduct current to charge the capacitor until it attains a predetermined potential and during the charging interval, a current impulse flows through the material to be welded. When the capacitor is charged to the predetermined potential, a third valve is rendered conductive and the capacitor is discharged through it. In response to the discharge current, the high vacuum valve is momentarily rendered non-conductive and interrupts the current flow to the capacitor. At the same time the charging of another capacitor through another pair of series connected valves is initiated. A potential produced in response to the charging current of the second capacitor maintains the series valves in the on-timing system non-conductive, so that while the second capacitor is charging, the flow of current to the material to be welded is interrupted. When the second capacitor is charged to a predetermined potential, another valve is rendered conductive and the capacitor is discharged. In response to the discharge current from the second capacitor, the charging of the first capacitor is reinitiated and a second impulse flows through the material to be welded. The second capacitor and its associated valves shall be designated herein as the off-timing system. When the off-time capacitor is discharged, a current impulse is supplied to a third capacitor which may be designated as the stop capacitor. When the latter has received a predetermined number of impulses, it interrupts the operation of the system.

To preset the apparatus to supply a predetermined number of welding impulses, the charging circuit for the stop capacitor is set so that it attains the stop potential after it has received a corresponding number of charging impulses. If it is desirable that the system operate as an ordinary seam welder, the stop capacitor may be charging through a high resistance (or the charging circuit may be opened) so that it does not attain the potential necessary to interrupt the timing. Where a single impulse spot weld is to be produced, the resistance in series with the stop capacitor may be reduced to a low value so that it is charged sufficiently to interrupt the timing by a single discharge of the off-time capacitor. The length of the individual impulses may be preset by adjusting the resistance through which the on-time capacitor is charged. The length of the pause intervals may be set by adjusting the resistance through which the off-time capacitor is charged.

Figure 2B:
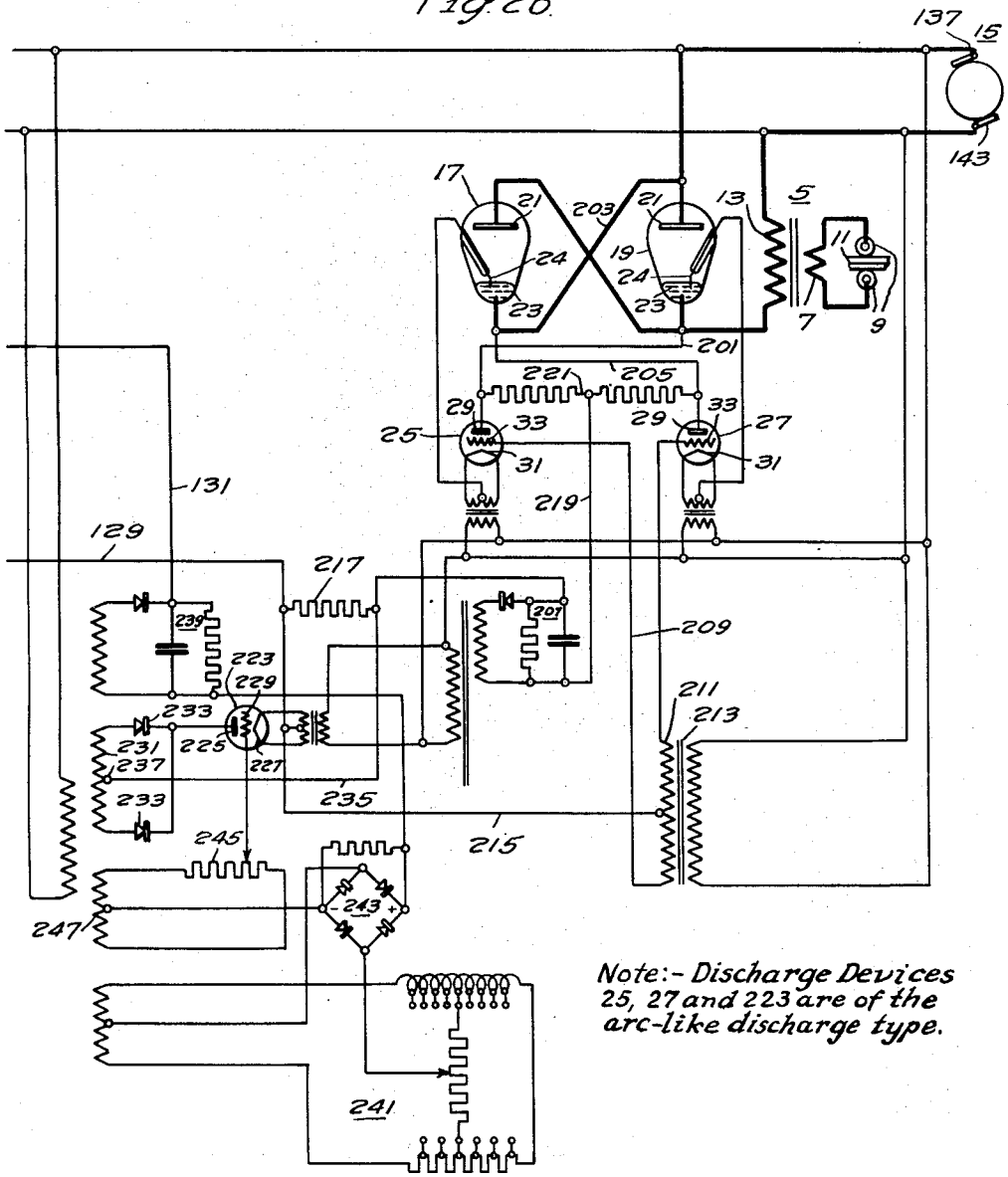

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings, in which:

Figure 1 is a diagrammatic view showing an embodiment of my invention;

Figs. 2a and 2b together constitute a diagrammatic view showing a modification of my invention;

Fig. 3 is a graph illustrating one aspect of the operation of the Fig. 1 embodiment; and, Fig. 4 is a graph illustrating one aspect of the operation of the Figs. 2a and 2b embodiment.

The apparatus shown in Fig. 1 comprises a welding transformer 5 across the secondary 7 of which a pair of welding electrodes 9 are connected. The material 11 to be welded is engaged by the electrodes 9 and when current flows through the transformer 5 welding current is supplied to the material. The primary 13 of the welding transformer 5 is supplied from a source of alternating current 15 which may be of the usual commercial 60-cycle type through a pair of ignitrons 17 and 19 connected in anti-parallel. Each of the ignitrons has an anode 21, a mercury pool cathode 23 and an ignition electrode 24. Ignition current is supplied to the ignitrons 17 and 19 through auxiliary electric discharge valves 25 and 27 of the arc-like type. Each of the latter comprises an anode 29, a cathode 31 and a control electrode 33.

The control electrode 33 and the cathode 31 of the auxiliary valve 25 associated with one of the ignitrons 17, which may be designated as the leading ignition, are connected through a section 35 of a divider 37 that supplies a bias potential to maintain the valve 25 non-conductive during pause intervals and when the apparatus is not in operation. The voltage divider 37 is energized from the full wave rectifier 39. The ignition valve 27 associated with the other ignitron 19, which may be designated as the following ignitron, is maintained non-conductive by a bias potential supplied by a capacitor 41 charged through a half wave rectifier 43 from the source 15. The latter bias potential is counteracted by impulses supplied through a control transformer 45, the primary 47 of which is connected across the primary 13 of the welding transformer 5 and the secondary 49 of which is connected to the control electrode of the ignition valve 27, in series with the biasing capacitor 41. When the leading ignitron 17 is rendered conductive, it carries current during a half-period of the source 15 and then becomes non-conductive. At the instant when the leading ignitron 17 becomes non-conductive, an impulse is supplied by transformer 45 which is of proper polarity and magnitude to render the following ignition valve 27 non-conductive and as a result the following ignitron 19 becomes conductive.

The biasing potential supplied by the voltage divider 37 to the leading ignition valve 25 is counteracted by the on-timing potential impressed in its control circuit from an auxiliary voltage divider 51 supplied through a pair of auxiliary valves 53 and 55 connected in series. One of the latter valves 53 is of the high vacuum type and the other 55 is of the arc-like type. The valves 53 and 55 are connected between the positive terminal 57 and an intermediate tap 59 of the main voltage divider 37 through the auxiliary voltage divider 51.

The high vacuum valve 53 has an anode 61, a cathode 63 and a control electrode 65. The control electrode 65 is connected to the cathode 63 through the secondary 67 of a transformer 69 which is normally deenergized. The valve 53 is of the usual commercial structure and is therefore capable of passing substantial current when thus biased to zero. The arc-like auxiliary valve 55 also has an anode 71, a cathode 73 and a control electrode 75. Its control electrode 75 is connected to its cathode 73 through a secondary winding 77 of an impulse transformer 79, an auxiliary voltage divider 81 in the off-timing circuit, a pair of intermediate taps 83 and 59 of the main voltage divider 37 and the on-timing voltage divider 51. Initially the on-timing arc-like auxiliary valve 55 is maintained non-conductive by the potential impressed from the main voltage divider 37 and, therefore, there is no current flow through the on-timing voltage divider 51. The latter valve is rendered conductive by an impulse supplied from the secondary section 77 and thereafter current through the on-timing voltage divider 51 and a capacitor 85 connected across the divider through a rheostat 87 is charged. When the capacitor 85 attains a predetermined potential, it is discharged through an auxiliary valve 89 connected in parallel therewith through the primary 91 of the transformer 69 and the on-timing interval is terminated because an impulse is impressed through the winding 67 to render the high vacuum valve 53 non-conductive.

The pause or off-timing intervals are measured by a circuit which is similar to the one just described. The latter also comprises a high vacuum valve 93 and an arc-like valve 95 connected in series to a pair of intermediate taps 83 and 97 of the main voltage divider 37 through the off-timing voltage divider 81. When the on-timing capacitor 85 is discharged, a potential impulse is impressed in the control circuit of the off-timing arc-like valve 95 through a secondary section 99 of the transformer 69 and the off-timing series valves 93 and 95 are rendered conductive. The current now conducted through the off-timing voltage divider 81 prevents the on-timing series valves 53 and 55 from becoming conductive. A capacitor 101 connected across the off-timing voltage divider 81 through a rheostat 103 is charged by the current flow through the divider. When the off-timing capacitor 101 has been charged to a predetermined potential, it is discharged through an auxiliary valve 105 of the arc-like type connected in parallel therewith through the primary 107 of a transformer 109 similar to the transformer 69 in the on-timing circuit. The off-timing interval is now terminated because the series valves 93 and 95 are rendered non-conductive by an impulse impressed on the control-current of the high vacuum valve 93 through the secondary section 111 of the transformer 109. A potential impulse is also impressed to charge a stop capacitor 115 through another secondary section 113 when the transformer 109 is energized by the discharge of the off-timing capacitor 101.

A welding operation is initiated by closing a circuit controller 117 such as a push button or a treadle switch. The controller 117 closes a circuit through the exciting coil 119 of a starting relay 121 energizing the relay. The upper contactor 123 of the relay 121 connects the anode 61 of the on-timing high vacuum valve 53 to the positive terminal 57 of the main voltage divider 37. Initially the arc-like valve 55 in series with the high vacuum valve 53 is non-conductive and because of the biasing potential supplied between the taps 83 and 59 of the voltage divider 37 in its control circuit, no current flows through the series network including the two valves. However, at the first occurrence of an impulse counteracting the biasing potential across the secondary section 77 of the saturable transformer 79 following the closing of the contactor 123, the arc-like valve 55 is rendered conductive. Current now flows in a circuit extending from the positive terminal 57 of the main voltage divider 37 through the anode 61 and cathode 63 of the high vacuum valve 53, a conductor 125, the anode 71 and cathode 73 of the arc-like valve 55, the on-timing voltage divider 51 to the intermediate tap 59 of the main divider.

The control circuit of the leading ignition valve 25 extends from an intermediate tap 127 of the main voltage divider 37 through a conductor 129, the cathode 31 and control electrode 33 of the ignition valve 25, a conductor 131, the on-timing auxiliary voltage divider 51 to the intermediate tap 59 of the main divider 37. The leading ignition valve 25 is supplied from the source 15 and the secondary 77 of the saturable transformer 79 is so connected in the control circuit of the on-timing arc-like valve 55 that the impulse rendering the valve conductive is impressed during the half periods during which the anode-cathode potential impressed on the leading valve 25 is positive. The primary 133 of the saturable transformer 79 is connected across the main source through a rheostat 135 which determines the instants in the half periods at which the impulses in the secondary section 77 occur. The rheostat 135 is so set that the on-timing arc-like valve is rendered conductive at an instant in a half period of the source which is later than the steady state current zero instant for the power factor of the load 5—11.

At the instant when current flow through the on-timing voltage divider 51 is initiated, a potential is impressed between the control electrode 33 and the cathode 31 of the leading ignition valve 25 which counteracts the biasing potential impressed from section 35 of the main voltage divider 37 and the leading ignition valve is rendered conductive. Current now flows in a circuit which extends from the upper terminal 137 of the supply source 15 through a conductor 139, the anode 29 and cathode 31 of the leading ignition valve 25, the ignition electrode 24 and cathode 23 of the leading ignitron 17, the primary 13 of the welding transformer 5, a conductor 141 to the lower terminal 143 of the source 15. The leading ignitron 17 is, therefore, rendered conductive and continues to supply current through the primary 13 during the remainder of the half-period. During the next half period, the anode-cathode potential impressed on the following ignitron 19 is positive and the latter is rendered conductive when the associated ignition valve 27 is rendered conductive by the impulses impressed from the control transformer 45. The leading ignitron 17 is then again rendered conductive and the operation is repeated. The primary 13 is supplied with current through the ignitrons 17 and 19 as long as on-timing voltage divider 51 carries current. Since the conductivity of the leading ignitron 17 is initiated at an instant in the half period subsequent to the steady state current zero point, the material 11 is not damaged by a sudden rush of current which may arise from a transient.

While the on-timing voltage divider 51 is passing current, the on-timing capacitor 85 is charged at a rate predetermined by the setting of the corresponding rheostat 87. The anode 145 of the discharge valve 89 for the capacitor is connected to the capacitor 85 through the primary 91 of the transformer 69. The control electrode 147 of the discharge valve is connected to the intermediate tap 149 of the on-timing voltage divider 51 through a secondary section 151 of the saturable transformer 79. The cathode 153 of the valve 89 is connected to the junction point 155 of the rheostat 87 and the capacitor 85. The intermediate tap 149 of the on-timing voltage divider 51 is set substantially at its electrical center. The two portions of the voltage divider 51 thus form together with the rheostat 87 and the capacitor 85 a balanced network in which the existence of a potential in the neighborhood of zero between the intermediate tap 149 of the voltage divider and the junction point 155 of the capacitor 85 and the rheostat 87 is substantially independent of the net potential impressed across the on-timing voltage divider.

The discharging valve 89 is preferably of the type that has a critical control electrode-cathode potential in the neighborhood of zero volts, i. e., approximately —2 to —10 volts. Since the control electrode 147 and the cathode 153 are connected to the conjugate points 149 and 155 of the network, the discharge valve 89 attains the critical potential at an instant which is substantially independent of the net-potential across the on-timing voltage divider 51, and, therefore, independent of the arc drop through the series valves 53 and 55. When the on-timing capacitor 85 has been charged to a potential such that the network 51, 85, 87 is balanced, an impulse supplied through the secondary 151 of the saturable transformers 79 renders the discharging valve 89 conductive and the capacitor is discharged through the primary 91 of the auxiliary transformer 69. The current flow through the primary 91 induces a potential in the secondary winding 67 which is impressed between the control electrode 65 and cathode 63 of the high vacuum valve 53 momentarily rendering the latter non-conductive. The circuit of the series valves 53 and 55 is thus opened and the valve 55 is rendered non-conductive and current flow through the on-timing voltage divider 51 is interrupted. The reinitiation of current flow through the on-timing circuit is prevented by the off-timing circuit. The latter is set into operation by an impulse impressed through the other secondary winding 99 of the auxiliary transformer 67 in the control circuit of the arc-like valve 95 in series with the high vacuum valve 93 when the on-timing capacitor 85 is discharged.

The control circuit of the arc-like valve 95 extends from the intermediate tap 97 of the main voltage divider 37 through the cathode 73 and control electrode 75 of the arc-like valve 95, the secondary 99 to the negative terminal 157 of the main voltage divider. The biasing potential supplied by the main voltage divider 37 normally maintains the off-timing arc-like valve 95 non-conductive. The potential is, however, counteracted by the impulse supplied from the transformer 69 and when the valve 95 is rendered conductive, current flows in a circuit extending from the intermediate tap 83 of the main voltage divider 37 through a conductor 159, the off-timing auxiliary voltage divider 81, the central movable contactor 161 of the starting relay 121, a conductor 163, the anode 61 and cathode 63 of the high vacuum valve 93, the anode 71 and cathode 73 of the arc-like valve 95 to the intermediate tap 97 of the voltage divider. Since the off-timing voltage divider 81 is in the control circuit of the arc-like valve 55 in the on-timing circuit, the current flow through the off-timing voltage divider 81 results in the impressing of a blocking potential on the on-timing arc-like valve 55, and the latter is maintained non-conductive. Moreover, when current flow through the follow-up ignition 19 is interrupted, after the interruption of current flow through the on-timing divider 51, the blocking potential on the ignition valve 25 becomes effective and current flow through the welding transformer 5 is discontinued.

The off-timing capacitor 101 which is connected in series with the rheostat 103 across the off-timing voltage divider 81 is now charged at a rate predetermined by the setting of the rheostat. The off-timing discharging valve 105 is of the same type as the on-timing discharging valve 89 and with the exception that the saturable transformer is omitted, is connected in the off-timing capacitor circuit in the same manner as the on-timing valve 89 is connected in its associated circuit. Accordingly, after the off-timing capacitor 101 has been charged to a predetermined potential such that the critical potential of the off-timing discharging valve 105 is reached, the latter is rendered conductive and discharges the capacitor.

As in the case of the on-timing circuit, an impulse is impressed in the control circuit of the high vacuum valve 93 through the secondary winding 111 of the auxiliary transformer 109 as a result of the discharge of the capacitor 101. The high vacuum valve 93 is momentarily rendered non-conductive and opens the off-timing circuit. The other secondary winding 113 of the auxiliary transformer 109 is connected across the stop capacitor 115 through a rheostat 165 and a rectifier 167 which may be of the dry type, but is preferably of the electronic type. When the off-timing capacitor 101 is discharged, the stop capacitor 115 receives an increment of charge through the rectifier 167.

The discontinuance of current flow through the off-timing voltage divider 81 removes the blocking potential from the on-timing arc-like valve 55 and the latter is again rendered conductive on receiving an impulse from the saturable transformer 79. Current now again flows through the on-timing voltage divider 51 and successive half wave current impulses are again supplied through the primary 13 of the welding transformer 5. The supply of current to the material 11 now again continues until the off-timing valves 93 and 95 are again rendered conductive by the discharge of the on-timing capacitor 85 and then there is another off-timing pause.

During each cycle consisting of an on-timing and an off-timing interval, an impulse is supplied to charge the stop capacitor 115. The latter capacitor is connected in the control circuit of a stop valve 169. The anode 171 of the latter valve is connected to the anode 61 of the high vacuum valve 93 in the off-timing circuit and the cathode 173 to the cathode 73 of the associated arc-like valve 95. The control electrode 175 of the stop valve 169 is in a circuit extending from the intermediate tap 97 of the main voltage divider 37 through a conductor 177, the cathode 173 and control electrode 175 of the stop valve, a conductor 179, the stop capacitor 115 to the negative terminal 157 of the main divider.

After a predetermined number of on and off cycles, an increment of charge is supplied to the stop capacitor 115 which raises its potential to a value such that the biasing potential supplied by the main divider 37 between the points 97 and 157 in the control circuit of the stop valve 169 is counteracted by the charge on the capacitor 115 and the valve is rendered conductive. Current is now supplied through the stop valve to the off-timing voltage divider 81 and the valves in the on-timing circuit are rendered non-conductive and remain in this condition. Further ignition of the ignitrons is, therefore, prevented and the welding operation is at an end. To initiate another welding operation, the start switch 117 must be reopened. When this occurs, the starting relay 121 is de-energized and the stop capacitor 115 is short circuited by its lower contactor 181 while the circuit through the stop valve 169 is open at the intermediate contactor 161.

The lengths of the on intervals and the off intervals may be preset by the rheostats 87 and 103, respectively, in the on-timing and off-timing circuits. The rheostat 165 in the charging circuit for the stop capacitor 115 determines the number of impulses supplied for each weld.

An analysis of the operation of the apparatus shown in Fig. 1 reveals that the impulses supplied by the secondaries 77 and 151 of the saturable transformer 79 to the auxiliary valves 55 and 89, respectively, in the on-timing circuit should be in opposite phase. This is illustrated in Fig. 3. In this view potential is plotted vertically and time horizontally. The upper sine wave 183 represents the anode-cathode potential supplied to the ignitrons 17 and 19. The lower peak form curves 185 represent the impulses supplied by the secondary 77 in the control circuit of the arc-like valve 55 in series with the high vacuum valves 53 in the on-timing circuit to render the former conductive. The rheostat 135 in the primary circuit of the saturable transformer 79 is preferably so set that the arc-like valve 55 in the on-timing system is rendered conductive at an instant later than the steady-state current zero for the load circicut 5—11. The phase position in the positive half cycles of the sine curve 183 at which the peaks 185 are shown therefore corresponds to an angle greater than the phase angle. The hatched areas 187 under the sine wave 183 represent the intervals during which the ignitrons 17 and 19 are conductive.

For the purpose of explaining the feature under discussion, it may be assumed that the non-conductive interval is to be one cycle in length. Under such circumstances, the potential from the off-timing divider 81 is applied for one cycle. Let us now assume that the discharging valve 89 in the on-timing circuit is rendered conductive after the ignitrons 17 and 19 have been conductive for one cycle by an impulse in phase with the impulse rendering the valve 55 conductive. The instant at which the discharging valve 89 is rendered conductive is represented by the light vertical line 189 and the termination of the conductive interval is represented by a corresponding line 191 one cycle later. Since the impulses supplied by the two windings 77 and 151 of the saturable transformer 79 are in phase, the light line 189 should have the same phase position as the peak 193 representing the potential which is impressed during the same half period from the transformer 79.

The blocking potential supplied by the off-timing voltage divider 81 becomes effective only after an impulse is impressed from auxiliary transformer 69 to render the valve 95 conductive. The impulse is impressed simultaneously with the one impressed on the high vacuum valve 53 to render it momentarily non-conductive. The arc-like valve 55 may thus be rendered non-conductive because the circuit is opened by the high-vacuum valve 53 before the blocking potential is supplied from divider 81. Since the potential represented by the peak 193 persists of a finite albeit short time, the control potential 193 impressed on the arc-like valve 55 may be sufficient to render it conductive just after it has been rendered non-conductive and before the blocking potential is applied. I have found that in practice, this actually occurs and that in lieu of two non-conductive half-cycles, two conductive half cycles, as presented by region 195 hatched in light lines follow the first and second half-cycles. If on the other hand, the impulses supplied by the secondaries 77 and 151 of the saturable transformer 79 are in opposite phase, the on-timing discharging valve 89 is rendered conductive at an instant represented by the heavy vertical line 197 and the supply of off-timing blocking potential terminates at an instant represented by the heavy line 199 one cycle later. When the on-timing discharging valve 89 is now rendered conductive, the corresponding impulses supplied to the arc-like auxiliary valve 55 in the series circuit by the secondary section 77 is of negative polarity and has no tendency to render the valve conductive when it is rendered non-conductive by the high-vacuum valve 53. The off-timing interval is thus initiated without any mishap and continues until the on-timing interval is re-initiated during the positive half cycle following that in which the off-timing interval terminates as represented by the heavy line 199.

Figs. 2a and 2b together show an interrupted spot welding arrangement incorporating the feature of heat control. In this arrangement, the current flow through the material to be welded is initiated at predetermined instants in each of the half periods during which it flows. The timing arrangement for this modification of my invention is the same as the timing system used in the Fig. 1 modification. However, the follow-up circuit in which the ignitrons and their ignition valves in the Fig. 1 apparatus are connected is replaced by a circuit in which the valves are controlled individually.

In the modification of my invention shown in Figs. 2a and 2b, the left-hand ignition valve 25 is connected in a circuit extending from the lower terminal 143 of the source 15 through the primary 13 of the welding transformer 5, a conductor 201, the anode 29 and cathode 31 of the ignition valve 25, the ignition electrode 24 and cathode 23 of the associated ignitron 17, a conductor 203 to the upper terminal 137 of the source. The right-hand ignition valve 27 is connected in a circuit extending to the upper terminal 137 of the source through the conductor 203, a conductor 205, the anode 29 and cathode 31 of the ignition valve 27, the ignition electrode 24 and cathode 23 of the associated main valve 19, the primary 13 of the welding transformer 5 to the lower terminal 143 of the source.

In the control circuits of the ignition valves 25 and 27, a biasing source 207 is connected so that normally neither of the valves is conductive. The control circuit for the left-hand valve 25 extends from the control electrode 33 through a conductor 209, the lower portion of the secondary 211 of a balancing transformer 213, a conductor 215, a resistor 217, the biasing source 207, a conductor 219, the right-hand portion of a mid-tapped resistor 221, the conductor 205, the cathode 23 and ignition electrode 24 of the associated ignitron 17 to the cathode 31 of the valve 25. The control circuit for the other ignition valve is similar, except that it extends through the upper portion of the secondary 211 of the balancing transformer 213. The ignition valves 25 and 27 are rendered conductive when current of proper polarity flows through the resistor 217 in their control circuits.

The current flow through the resistor 217 is controlled from an auxiliary valve 223 which is preferably of the arc-like type and has an anode 225, a cathode 227 and a control electrode 229. The anode circuit for the auxiliary valve 223 extends from the terminals of a secondary section 231 supplied from the source 15 through either of a pair of rectifiers 233 connected to the terminals so as to conduct the alternate half waves of the potential supplied by the secondary section, the anode 225 and cathode 227 of the auxiliary valve 223, the resistor 217, a conductor 235 to the intermediate tap 237 of the secondary section. The auxiliary valve 223 thus constitutes the load circuit of the full wave rectifier formed by the secondary section 231 and the rectifier 233 and when it is rendered conductive it carries current during successive half cycles of the source.

In the control circuit of the auxiliary valve 223, a biasing source 239 is provided which normally maintains the valve non-conductive. The bias potential is partly counteracted by the potential derived from the on-timing voltage divider 51. For this purpose, the conductors 129 and 131 from the on-timing circuit which in the Fig. 1 arrangement, are connected to the leading ignition valve 25, are in the Fig. 2 arrangement connected in series with a biasing potential 239 in the control circuit of the auxiliary valve 223. The sum of the biasing potential plus the potential supplied by the on-timing voltage divider 51 when the on-timing valves 53 and 55 are conductive is in itself insufficient to render the auxiliary valve 223 conductive. To render the valve conductive potential impulses are derived from the main source 15 through a phase shift network 241 and a full wave rectifier 243 and impressed in the control circuit. The impulses are of positive polarity but when the current flow through the on-timing voltage divider 51 is zero, they are not sufficient to render the auxiliary valve 223 conductive. The control circuit for the auxiliary valve 223 extends from the upper terminal of the on-timing voltage divider 51 through the conductor 131, the biasing source 239, the full wave rectifier 243 through which the impulses are supplied, a voltage divider 245, connected across a secondary section 247 supplied from the source 15 and used to compensate for unbalanced potential conditions in the ignitrons 17 and 19, the control electrode 229 and cathode 227 of the auxiliary valve 223, the conductor 129 to the intermediate tap 127 of the main voltage divider 37.

During the intervals during which current flows through the on-timing voltage divider 51, the auxiliary valve is rendered conductive at instants in successive half periods of the source predetermined by the setting of the phase shift network 241 through which the full wave rectifier 243 is supplied. Current flow is, therefore, initiated at these instants through the valve 223 and through the resistor 217 in series therewith, and the biasing potential impressed on the ignition valves 25 and 27 being thus counteracted, the latter are each in its turn rendered conductive and energize the main valves 17 and 19 so that they conduct current through the welding load 5—11. Each of the main valves 17 and 19 is thus rendered conductive during successive half periods of the source at instants predetermined by the setting of the phase shift network 241. The number and length of conductive and non-conductive intervals is, as in the Fig. 1 arrangement, determined by the settings of the various rheostats 51, 81 and 165 in the timing system.

An analysis of the operation of Fig. 2 reveals that in this case pause intervals should be initiated in an odd numbered half period following the initiation of current flow in any conductive interval. This situation is illustrated in Fig. 4 in which potential is again plotted vertically and time horizontally. The sine wave 249 in the upper portion of Fig. 4 represents the source of potential. The hatched area 251 under the first and second waves represents the interval during which one of the ignitrons 17 and 19 is conductive when current flow is initiated during the first half-period. The peaked curves 253 in the lower portion of Fig. 4 represent the ignition potential supplied by the saturable transformer 79 to the arc-like auxiliary valve 55 connected in series with the high vacuum valve 53 in the on-timing circuit. The light vertical lines 255 and 257 represent the beginning and end of the supply of off-timing potential for a hypothetical situation in which the off-timing is initiated during the second half period, i. e., an uneven half period, and persists for a period of the source. In such a case, it will be noted that for ignition delay for a substantial portion of a half period no welding current flows during the negative half periods during which the off-timing starts. This is illustrated by the region 259 hatched in eight lines under the curve 249. Accordingly, if the off-timing interval is initiated as represented by the light line 255, the current is conducted through the welding transformer during an odd number of half periods and, therefore, the transformer may be saturated. The proper initiation and termination of the off-timing interval is represented by the heavy lines 261 and 263. In this case the off-timing is initiated during an even half period and, therefore, current flows through the load during an even number of half periods and the magnetism of the welding transformer 5 is not unbalanced.

In the Fig. 2 arrangement, therefore, the secondary windings 77 and 151 of the saturable transformer should be connected so that the impulses which they supply are in phase.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In combination with a source of direct current, a high vacuum electric discharge valve having a plurality of principal electrodes and a control electrode, an arc-like electric discharge valve having a plurality of principal electrodes and a control electrode, means for connecting the discharge paths between the principal electrodes of said valves in series across said source, means for maintaining the potential between the control electrode and one of the principal electrodes of said high vacuum valve such that said high vacuum valve is conductive if said arc-like valve is conductive, means for maintaining the potential between said control electrode and one of said principal electrodes of said arc-like valve such that said arc-like valve is non-conductive, means for impressing an impulse between the control electrode and said one principal electrode of said arc-like valve to render said arc-like valve conductive and means actuated by the current flow through said valves, for thereafter impressing an impulse of potential between the control electrode and said one principal electrode of said high vacuum valve to render said high vacuum valve non-conductive and thereby to render said arc-like valve non-conductive.

2. In combination with a source of direct current, a high vacuum electric discharge valve having a plurality of principal electrodes and a control electrode, an arc-like electric discharge valve having a plurality of principal electrodes and a control electrode, means for connecting the discharge paths between the principal electrodes of said valves in series across said source, means for maintaining the potential between the control electrode and one of the principal electrodes of said high vacuum valve such that said high vacuum valve is conductive if said arc-like valve is conductive, means for maintaining the potential between said control electrode and one of said principal electrodes of said arc-like valve such that said arc-like valve is non-conductive, means for impressing an impulse between the control electrode and said one principal electrode of said arc-like valve to render said arc-like valve conductive and means, including charge storing means to be charged by the current flow through said valves and means for discharging said storing means, for thereafter impressing a potential between the control electrode and said one principal electrode of said high vacuum valve to render said high vacuum valve non-conductive and thereby to render said arc-like valve non-conductive.

3. Apparatus according to claim 2 characterized by the fact that the discharging means, comprises an auxiliary electric discharge valve and a transformer having its primary in series with the charge storing means and said auxiliary valve and a secondary connected between the control electrode and said one principal electrode of said high vacuum valve.

4. Apparatus according to claim 2 characterized by the fact that the discharging means, comprises an auxiliary electric discharge valve having a plurality of principal electrodes and a control electrode and a transformer having its primary in series with the charge storing means and the principal electrodes of said auxiliary valve and a secondary connected between the control electrode and said one principal electrode of said high vacuum valve, and by means for impressing an impulse of short duration compared to the time during which said main valves are conductive between said control electrode and a principal electrode of said auxiliary valve to render said auxiliary valve conductive.

5. Apparatus according to claim 2 characterized by the fact that the discharging means, comprises an auxiliary arc-like electric discharge valve having a plurality of principal electrodes and a control electrode and a transformer having its primary in series with the charge storing means and the principal electrodes of said auxiliary valve and a secondary connected between the control electrode and said one principal electrode of said high vacuum valve, and by means for impressing an impulse of short duration compared to the time during which said main valves are conductive between said control electrode and a principal electrode of said auxiliary valve to render said auxiliary valve conductive.

6. For use in supplying power from a source of current to a load, the combination comprising valve means interposed between said source and said load, a control circuit for said valve means, means for supplying a potential to said control circuit to render said valve means conductive, means for restraining said potential from being supplied to said control circuit by said means at intervals for predetermined intervals of time and timing means actuable by said restraining means and in accordance with the number of intervals during which it restrains said supply means for permanently restraining said supply means from supplying said potential.

7. For use in supplying power from a source of current to a load, the combination comprising valve means interposed between said source and said load, a control circuit for said valve means, means for supplying a potential to said control circuit to render said valve means conductive, means for restraining said potential from being supplied to said control circuit by said supplying means at intervals for predetermined intervals of time, timing means actuable by said restraining means and in accordance with the number of intervals during which it restrains said supply means for permanently preventing said supply means from supplying said potential, and adjustable means for predetermining the number of said intervals which are to elapse in any case before said preventing means functions.

8. For use in supplying power from a source of current to a load, the combination comprising valve means interposed between said source and said load, a control circuit for said valve means, means for supplying a potential to said control circuit to render said valve means conductive, means actuable by said supplying means for restraining said potential from being supplied to said control circuit by said supplying means at repeated intervals, each of the last said intervals being a predetermined interval of time in length and occurring after said supplying means has supplied said potential for a predetermined interval of time, timing means actuable by said restraining means and in accordance with the number of intervals during which it restrains said supply means for permanently preventing said supply means from supplying said potential, and adjustable means for predetermining the number of said intervals which are to elapse in any case before said preventing means functions.

9. For use in supplying power from a source of current to a load, the combination comprising valve means interposed between said source and said load, said valve means having a plurality of electrodes, a first capacitor, first circuit means for charging said first capacitor, means for deriving a potential from said first circuit means and impressing it between at least one pair of said electrodes to render said valve means conductive, second circuit means for discharging said first capacitor, means responsive to the discharge of said capacitor for interrupting the charging of said first capacitor and the impressing of said potential thereby to render said valve means non-conductive, a second capacitor, third circuit means for charging said second capacitor, said third circuit means to be actuated in response to the discharge of said first capacitor, fourth circuit means for discharging said second capacitor, means responsive to the discharge of said second capacitor for reinitiating the charging of said first capacitor, a third capacitor, means responsive to the discharge of said second capacitor for supplying an impulse to charge said third capacitor and means responsive to said third capacitor after it has received a predetermined number of said impulses to prevent further charging of said first capacitor.

10. For use in supplying power from a source of current to a load, the combination comprising main valve means interposed between said source and said load, said main valve means having a plurality of electrodes, a first capacitor, first circuit means including auxiliary valve means for charging said first capacitor, means for deriving a potential from said first circuit means and impressing it between at least one pair of said electrodes to render said main valve means conductive, second circuit means including auxiliary valve means for discharging said first capacitor, means responsive to the discharge of said capacitor for interrupting the charging of said first capacitor and the impressing of said potential derived from said first circuit thereby to render said main valve means non-conductive, a second capacitor, third circuit means including auxiliary valve means for charging said second capacitor, fourth circuit means including auxiliary valve means for discharging said second capacitor, means responsive to the discharge of said second capacitor for reinitiating the charging of said first capacitor, a third capacitor, means including auxiliary valve means responsive to the discharge of said second capacitor for supplying an impulse to charge said third capacitor and means responsive to said third capacitor after it has received a predetermined number of said impulses to prevent further charging of said first capacitor.

11. Apparatus according to claim 10 characterized by the fact that the source is of the alternating current type and the main valve means comprises a pair of valves connected in anti-parallel to conduct current during alternate half periods from the source to the load, said valves being connected in a follow up circuit, and further by a saturable transformer having a pair of secondaries, one of the secondaries being connected to supply impulses to render the auxiliary valve means in the first circuit for charging the first capacitor conductive and the other secondary being connected to supply impulses in opposite phase to the last-mentioned impulses to render the auxiliary valve in the first circuit for discharging the first capacitor conductive.

12. Apparatus according to claim 10 characterized by the fact that the source is of the alternating current type and the main valve means comprises a pair of valves connected to conduct current during alternate half periods from the source to the load, by means for rendering each of said valves in its turn conductive at a predetermined instant in successive half periods of said source and further by a saturable transformer having a pair of secondaries, one of the secondaries being connected to supply impulses to render the auxiliary valve means in the first circuit for charging the first capacitor conductive and the other secondary being connected to supply impulses in phase with the last-mentioned impulses to render the auxiliary valve in the first circuit for discharging the first capacitor conductive.

13. In a system for supplying power from a source of current to a load, the combination comprising main valve means interposed between said source and said load, a control circuit for said main valve means, control means connected to said control circuit for controlling said main valve means, said control means comprising a source of direct current, a high vacuum electric discharge valve having a plurality of electrodes and a gaseous valve of the arc-like type having a plurality of electrodes connected in series across said direct current source, means for impressing a potential between a pair of said electrodes of said high vacuum valve such as to maintain it conductive if said gaseous valve is conductive, means for impressing a potential between a pair of electrodes of said gaseous valve to render it conductive, means for impressing a potential between a pair of electrodes of said high vacuum valve a predetermined interval of time after said gaseous valve has been rendered conductive to render said high vacuum valve non-conductive and thereby to render said gaseous valve non-conductive and means for rendering said means for impressing a potential between a pair of electrodes of said gaseous discharge valve ineffective for a predetermined interval of time.

14. In a system for supplying power from a source of current to a load, the combination comprising main valve means interposed between said source and said load, control electrode means for said main valve means, a first capacitor, a first circuit means for charging said capacitor, said first circuit means comprising a source of direct current, a high vacuum electric discharge valve having a plurality of electrodes and a gaseous valve of the arc-like type having a plurality of electrodes connected in series across said direct current source, means for impressing a potential between a pair of said electrodes of said high vacuum valve such as to maintain it conductive if said gaseous valve is conductive, means for impressing a potential between a pair of electrodes of said gaseous valve to render it conductive, means for deriving a potential from said first circuit means and impressing it on said control electrode means of said main valve means, second circuit means including auxiliary valve means for discharging said first capacitor, means responsive to the discharge of said first capacitor for impressing a potential between a pair of electrodes of said high vacuum valve to render said high vacuum valve non-conductive and thereby to render said gaseous discharge valve non-conductive, a second capacitor, third circuit means including auxiliary valve means for charging said second capacitor, means responsive to the discharge of said first capacitor for initiating the charging of said second capacitor, fourth circuit means including auxiliary valve means for discharging said second capacitor, and means responsive to the discharge of said second capacitor for reinitiating the charging of said first capacitor.

15. For use in supplying power from a source of alternating current potential to a load, the combination comprising a pair of electric discharge valves connected in anti-parallel between said source and said load, each valve to conduct current during alternate half periods from said source to said load, control circuits for said valves, means for supplying potential impulses to said control circuits to render each of said valves conductive in its turn during a predetermined number of successive half periods of said source, means for thereafter supplying a potential to restrain the conductivity of said valves, and means including a potential impulse derived from said source for initiating the last-mentioned potential supply in a half period of the source potential having the same polarity as the half-period during which the supply of said potential impulses for rendering the valves conductive is initiated.

16. For use in supplying power from a source of alternating current potential to a load, the combination comprising a pair of electric discharge valves connected in anti-parallel between said source and said load, each valve to conduct current during alternate half periods from said source to said load, a control circuit for one of said valves, means for supplying potential impulses to said one valve to render it conductive for a predetermined interval of time, said valves being connected in a follow-up circuit, means for thereafter supplying a potential to restrain the conductivity of said valves, and means including a potential impulse derived from said source for initiating the last-mentioned potential supply in a half period of the source having the opposite polarity as the half period during which the supply of said potential impulses for rendering said one valve conductive is initiated.

FINN H. GULLIKSEN.